(No Model.) 2 Sheets—Sheet 1.
J. P. STEVENSON.
CAR WHEEL.
No. 319,341. Patented June 2, 1885.
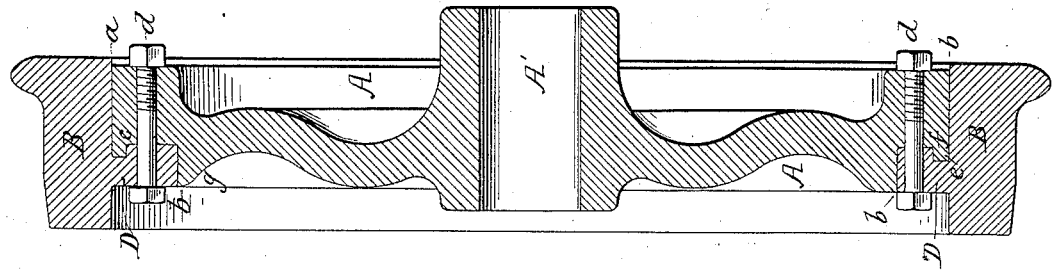
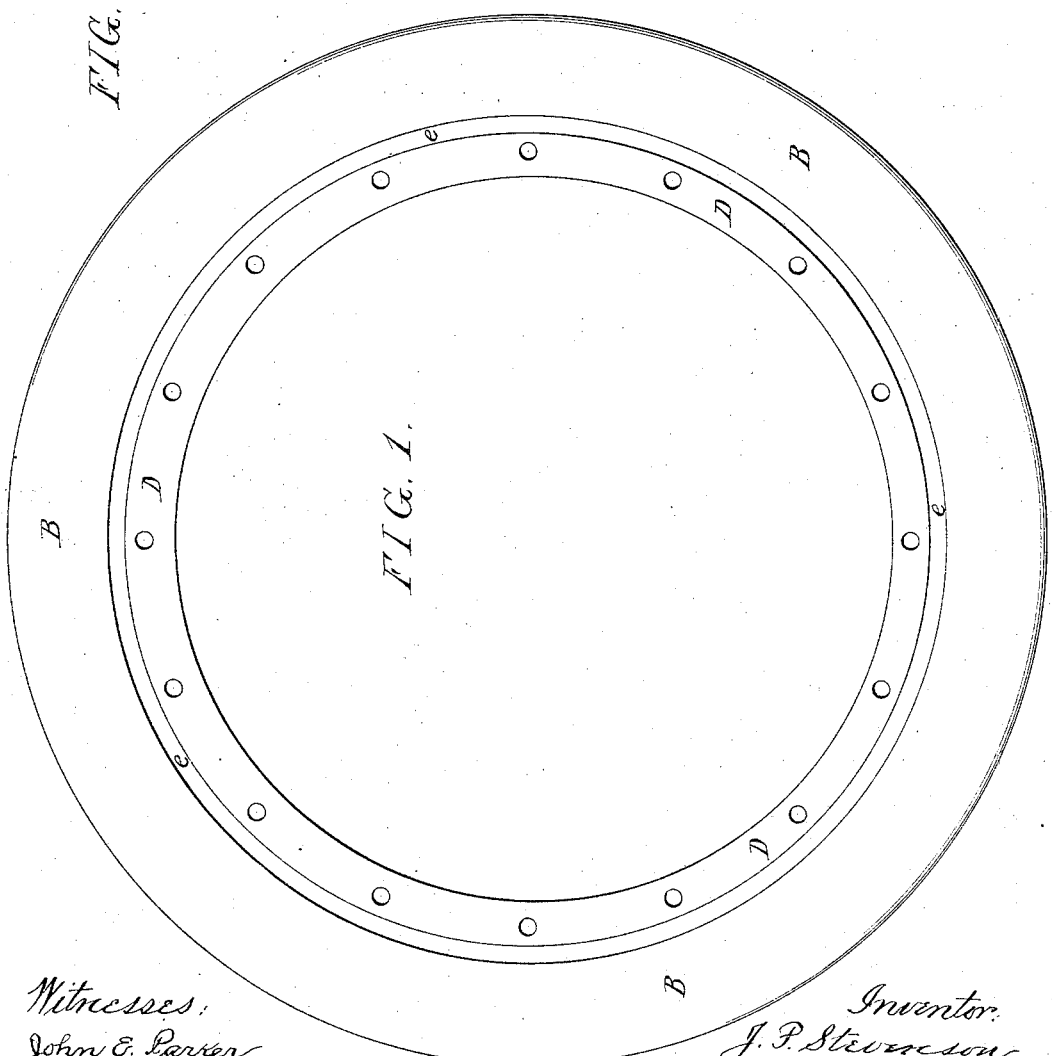
Witnesses:
John E. Parker
Harry Smith
Inventor.
J. P. Stevenson
by his attorneys
Howson & Sons (No Model.) 2 Sheets—Sheet 2.
J. P. STEVENSON.
CAR WHEEL.
No. 319,341. Patented June 2, 1885.
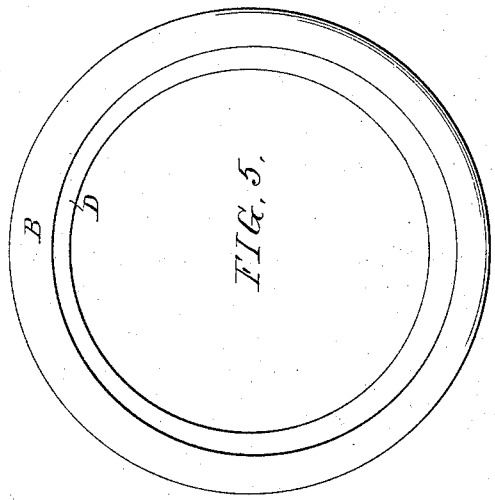
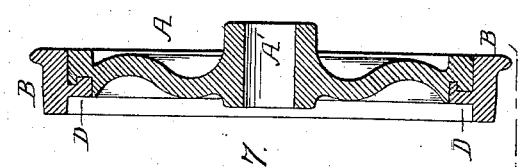
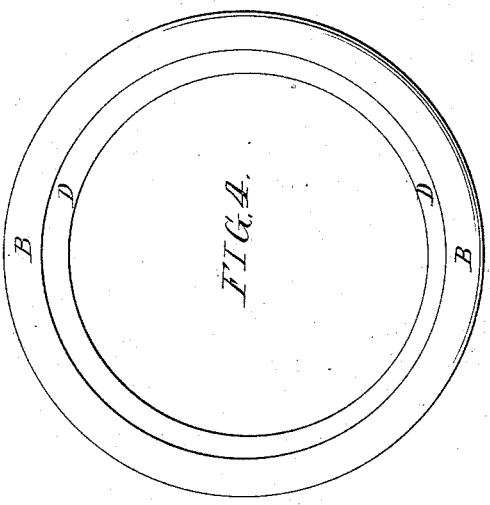
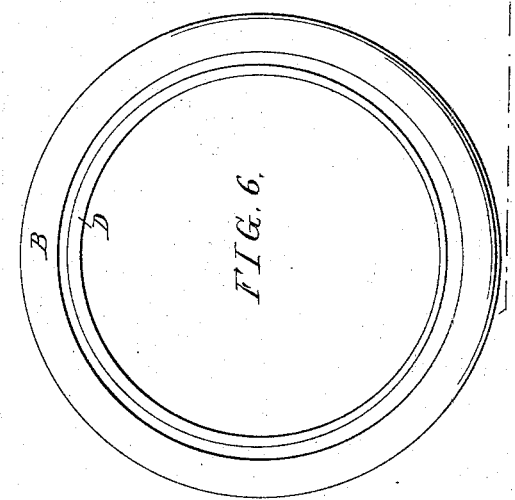
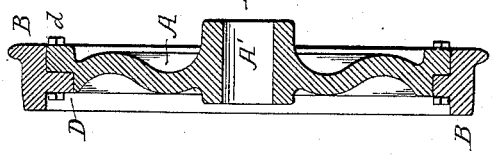
Witnesses,
John E. Parker
Harry Smith
Inventor.
J. P. Stevenson
by his Attorneys
Howson & Son

UNITED STATES PATENT OFFICE.

JOSEPH P. STEVENSON, OF LEWISTOWN, PENNSYLVANIA.

CAR-WHEEL.

SPECIFICATION forming part of Letters Patent No. 319,341, dated June 2, 1885.

Application filed April 13, 1885. (No model.)

*To all whom it may concern:*

Be it known that I, JOSEPH P. STEVENSON, a citizen of the United States, and a resident of Lewistown, Mifflin county, Pennsylvania, have invented certain Improvements in Car-Wheels, of which the following is a specification.

My invention relates to that class of car-wheels in which the tire is constructed separately from, but is to be secured to, the center or body of the wheel; and the object of my invention is to so construct the said tire and body that they can be firmly secured together in a simple manner and without liability of their becoming loose or causing excessive strain on the bolts. I attain this object in the manner which I will now proceed to describe, reference being had to the accompanying drawings, in which—

Figure 1 is a side view of one form of the tire separate from the body of the wheel. Fig. 2 is a sectional view of the same form of tire, together with the body of the wheel to which it is secured. Fig. 3 is a sectional view, drawn to a smaller scale, of another form of tire and wheel. Fig. 4 is a side view of the same tire separate from the body of the wheel. Fig. 5 is a similar view of a modification; and Figs. 6 and 7 are side and sectional views, respectively, of another form of wheel.

A is the body of the wheel, with a hub, A', forming part thereof or secured thereto in any suitable manner.

B is the tire, which is to be secured to the body of the wheel so firmly that there will be no danger of the tire becoming loose on the body of the wheel when in use.

The main feature of my invention consists in making the joint between the tire and the body of the wheel in two or more annular planes eccentric in respect to each other.

In all the constructions illustrated in the drawings the inner face of the tire is shown as provided with an annular web or collar, D, through which and through the rim of the body of the wheel pass the transverse retaining-bolts *d*. This web or collar is preferably provided with an annular recess, *e*, on one side, into which fits a corresponding flange, *f*, on the extreme rim of the body of the wheel, as shown in the constructions Figs. 1, 2, 6, and 7; but, if preferred, the recess and flange may be dispensed with, as in the constructions illustrated in Figs. 3, 4, and 5. In all cases, however, the annular planes of the joint should be eccentric to each other, so that the tire is locked on the body, so far as circumferential movement is concerned, and strain on the bolts *d* is thus prevented.

The annular planes of the joint may all be eccentric to the axis of the wheel, as well as to each other; but it is preferable to make but one of said planes eccentric to the axis, so that but one extra adjustment of the wheel in the lathe is required in turning or truing the faces of the planes.

In the wheel shown in Figs. 1 and 2 the joint has three annular planes, *a*, *b*, and *c*, the planes *a* and *c* being concentric with the axis, but the plane *b* being eccentric thereto. In the wheel shown in Figs. 3 and 4 the joint has but two annular planes, *a* and *b*, the former being concentric and the latter eccentric, and in the tire shown in Fig. 5 this is reversed, the plane *b* being concentric and the plane *a* eccentric. The wheel shown in Figs. 6 and 7 has the joint in three annular planes, of which the plane *c* only is eccentric.

I claim as my invention—

1. The combination of the body of a car-wheel with a rim or tire secured thereto, the joint between the body and tire presenting two or more annular planes eccentric in respect to each other, as set forth.

2. The combination of the tire of a car-wheel, having an inner web or collar, with the body of the wheel secured to said collar, the tire and body of the wheel having eccentric surfaces forming the joint between the two, as set forth.

In testimony whereof I have signed my name to this specification in the presence of two subscribing witnesses.

JOSEPH P. STEVENSON.

Witnesses:
  WM. G. NEILSON,
  HARRY SMITH.